United States Patent [19]

Ellis

[11] Patent Number: 4,864,334

[45] Date of Patent: Sep. 5, 1989

[54] VIDEO CART

[76] Inventor: Daniel C. Ellis, 3105 Edgar, Maplewood, Mo. 63143

[21] Appl. No.: 197,390

[22] Filed: May 23, 1988

[51] Int. Cl.⁴ .............................................. G03B 29/00
[52] U.S. Cl. ..................................... 354/81; 354/293; 352/243; 280/47.2; 280/47.26; 248/129
[58] Field of Search .................. 354/81, 293; 352/242, 352/243; 280/47.2, 47.26; 248/129, 316.7

[56] References Cited

U.S. PATENT DOCUMENTS

| | | | |
|---|---|---|---|
| 2,932,478 | 4/1960 | Krieger | 354/293 |
| 2,990,764 | 7/1961 | Wilder | 354/81 |
| 3,850,441 | 11/1974 | Peters | 280/47.2 |
| 4,009,891 | 3/1977 | Jensen | 280/47.2 |
| 4,037,763 | 7/1977 | Turchen | 354/81 |
| 4,166,687 | 9/1979 | Viering | 354/293 |
| 4,542,909 | 9/1985 | Littwin et al. | 354/293 |

Primary Examiner—A. A. Mathews
Attorney, Agent, or Firm—Lewis A. Thaxton

[57] ABSTRACT

The present invention relates to a maneuverable, foldable and transportable video cart, particularly for use in the video filming of subjects on location. The video cart, pertaining hereto, is of such a designed function that it can be placed in a folded and non-filming position available for transporting from studio to filming location. At the filming site, the video cart of this invention can be readily unfolded and arranged in its filming position. The video cart is equipped with wheels for maneuvering at filming location, storage compartments for sundry filming accessories, camera mounting means, a self-contained power supply, and is entirely manageable by a single operator.

4 Claims, 4 Drawing Sheets

VIDEO CART

BACKGROUND OF THE INVENTION

This invention is in the field of camera handling equipment and more particularly to a transportable, foldable, maneuverable, and multifunctional video cart.

When a camera operator arranges to film a subject, the operator ordinarily sets up a tripod with camera mounted thereon at the location of the subject. Sequentially, the operator adjusts the height of the tripod and the angular orientation of the camera. When the operator wants to film the subject at a different angle or film another subject at a different location, the operator must collapse the tripod and reset same at another location. Clearly, such running about is laborious and time consuming.

The prior art, however, was cognizant of such problems in the industry as reflected in U.S. Pat. No. 4,166,687, which issued on Sept. 4, 1979 to R. Viering. The patentee discloses a mobile photographic cart that can be transported and operated by one person. Viering's cart however, suffers the disadvantage of the camera operator disconnecting and reconnecting the power supply, or in the alternative, running a very long electric cord in and about the filming site. Similarly, K. Littwin et al., in U.S. Pat. No. 4,542,909 and issuing on Sept. 24, 1985, shows a mobile TV camera cart having a monopodial camera mount and an operator's seat attached. The patentee's cart also relies on an outside power source and teaches no means of storing multiple camera accessories.

The maneuverable video cart of the present invention simplifies the filming process for the camera operator by not only making it easier for the operator to move the essential camera and equipment about, but also in controlling the camera orientation once the cart is in position for the rapid film recording of the subjects. Moreover, such simplification is achieved without the exposure of electrical wires about the floor, with their inherent dangers, since the instant video cart contains its own portable power source.

Accordingly, it is a general object of this invention to provide a maneuverable, self-sufficient, inexpensive video cart for use by a lone camera operator.

It is particularly an object of the present invention to provide a video cart that contains its own electrical power supply.

It is a further object of the present invention to provide a video cart having compartments for batteries, VCR, video monitor, and requisite camera accessories.

It is an additional object of the present invention to provide a video cart that is partially collapsible for easy transport.

It is yet another object of the present invention to provide a video cart equipped with camera mounting means.

SUMMARY OF THE INVENTION

The present invention has been developed with a view toward providing a video camera operator with a mobile and compartmentalized camera accessory cart. The video cart, of this invention, can be used conveniently in circumstances where it is desired to move the camera, video monitor, VCR unit and power supply over a distance while continuously filming subject material. The cart unit is easily moved in its unfolded operative position by means of four affixed wheels.

On the other hand, the video cart can be folded, by a single operator, to a two wheel stance wherein it is prepared for transporting elsewhere.

A better understanding of the subject invention will be enabled when the following written description is read in conjunction with the appended drawings.

DESCRIPTION OF PREFERRED EMBODIMENTS

Figure 1:
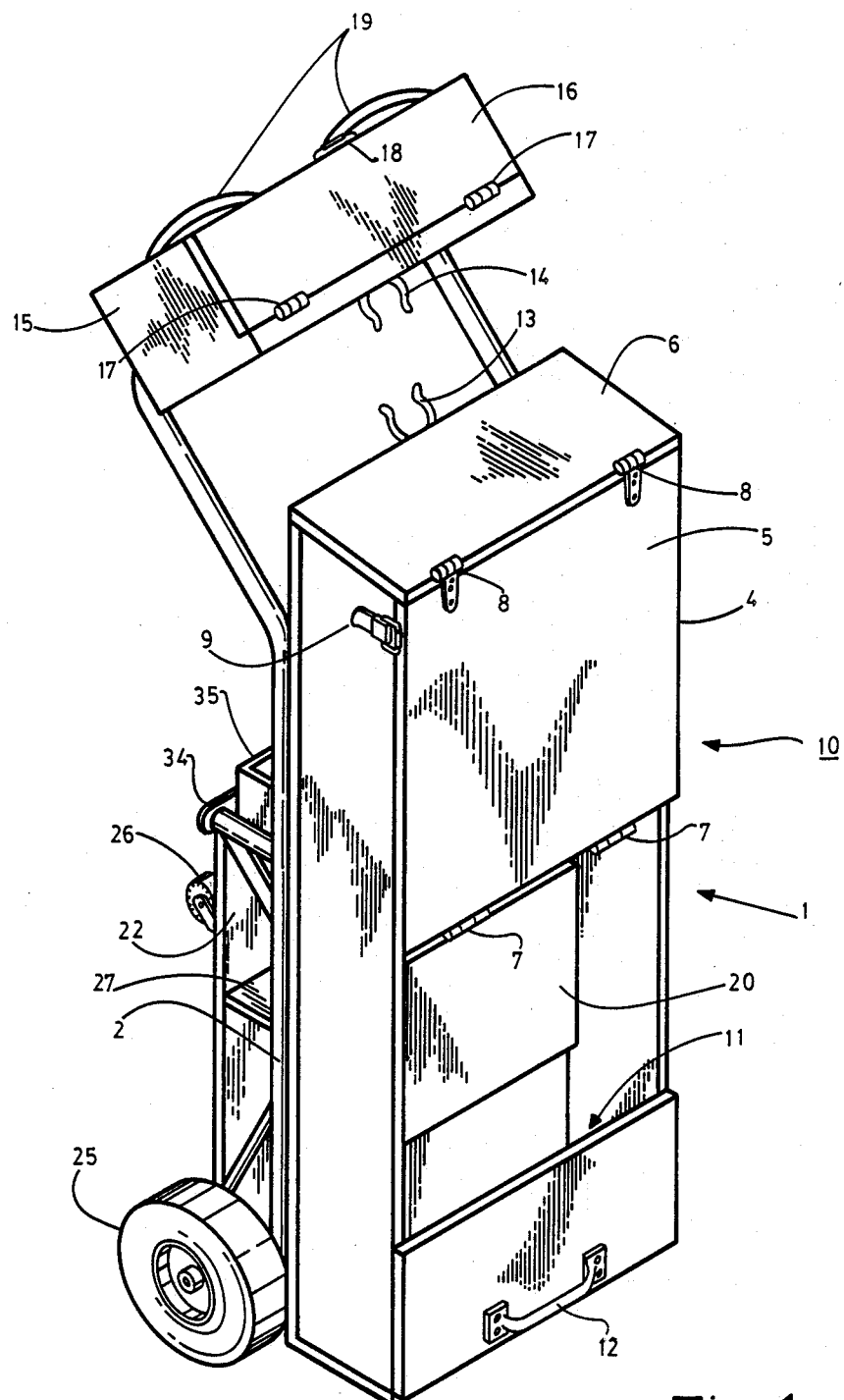
FIG. 1 is a front perspective view of a video cart in accordance with the invention in its transporting and folded position.
Figure 2:
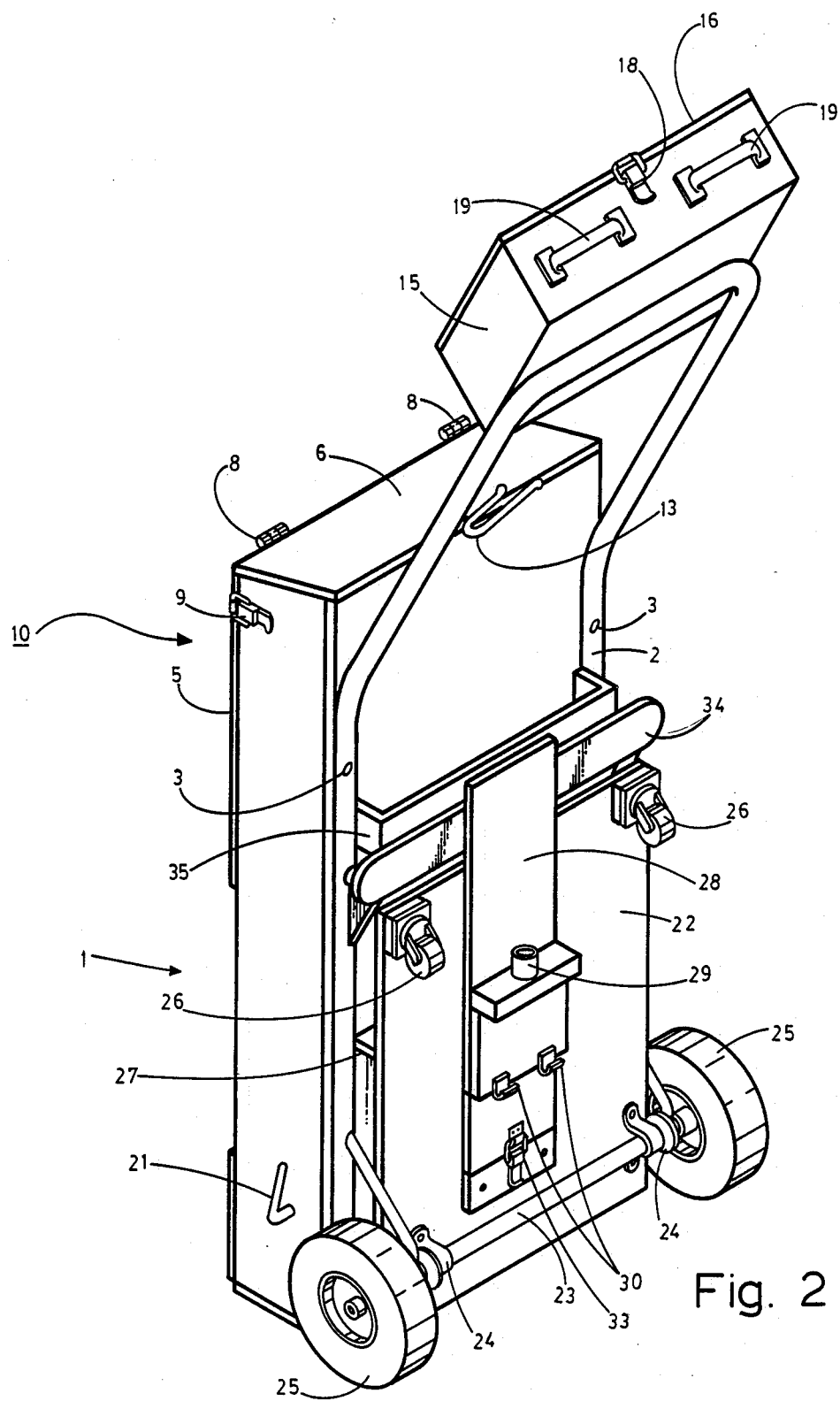
FIG. 2 is a rear perspective view of a video cart in accordance with the invention in its transporting and folded position.

Referring now to the drawings, wherein like numerals refer to like parts throughout the several views. FIGS. 1 and 2 show the maneuverable and folded video cart 10 of the present invention which includes a rectangular housing 1 mounted to a conventional rigid hand carriage chassis 2. Housing 1 is attached to chasis 2 by means of bolts 3. Housing 1 consists of a video monitor compartment 4, at its top end, which is enclosed by a plural hinge cover 5 and 6. Additionally, housing 1 contains a spare batteries compartment 11 disposed at its bottom end. Handle 12 is affixed to compartment 11 to facilitate the lifting of unit 10 in transport. Rectangular and hinged lip 20 is shown in the up position and will be described more fully as this description proceeds. Two laterally opposing latches 9 are attached to each side of compartment 4 to secure cover 5 when the unit is in the inoperative and/or transport mode. Dual hinges 7 are disposed at the bottom end of compartment 4 to permit opening means thereof, while dual hinges 8 are disposed at the top end of compartment 4 between covers 5 and 6. The artisan can appreciate that when latches 9 are secured, storage or retrieval from compartment 4 is permitted via lifting cover 6 which is flexibly attached to cover 5. Centered at the top rear of compartment 4 is mounted the U-shaped rest 13, which engagedly supports the camera monopode when unit 10 is in the operative and unfolded mode.

Rectangular compartment 15, which is also provided for storing operating accessories, is situated at the extreme top end of unit 10. Centered at the front bottom of compartment 15 is a corresponding U-shaped rest 14, which also engagedly supports the camera monopode, along with rest 13, and both when unit 10 is in its operative mode. Cover 16, attached by dual hinges 17 along a front bottom ridge of compartment 15 permits entrance thereto. Latch 18 is provided to lock cover 16 to the top lid of compartment 15. Plural handles 19 are attached at the top rear of compartment 15 to assist the operator in moving unit 10 for a selected purpose.

Figure 4:
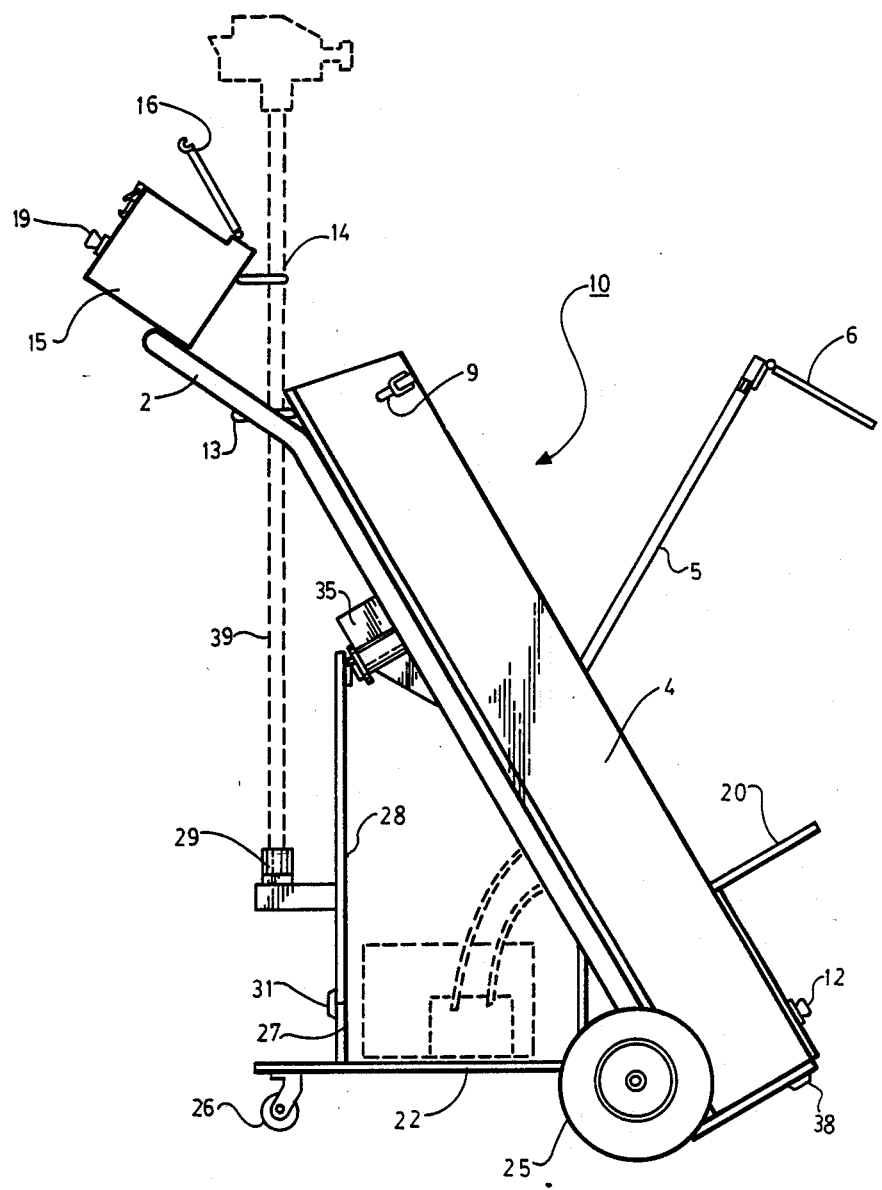
FIG. 4 is a side elevational view of the invention illustrating a mounted camera monopode, while the cart is in an unfolded and operative position.

Focusing more particularly on FIG. 2, it is shown that housing 1 is equipped with hook 21 for receiving the bottom end of monopode 39 when the monopode is not in use. It can also be seen that unit 10 contains a drop platform 22 pivotally attached to axle 23 by means of brackets 24, and at the base of a conventional hand carriage having pneumatic wheels 25. Platform 22 is equipped with two laterally situated rollers 26, on its underside, that enables the operator to maneuver unit 10 about when the unit is unfolded and in its operational mode. Platform 22 is also equipped with a cross member 27 bolted on its top side and used to secure detachable brace 28 when unit 10 is in its unfolded position. Member 27 contains a latch 32 (not shown) to secure member 27 to the rear of housing 1 when unit 10 is in the folded position. Brace 28 contains shank 29 to engagedly support monopode 39 at its bottom end, when unit 10 is unfolded. Two parallel latch receptacles 30 are disposed at the bottom end of brace 28 for receiving each of latches 31 correspondingly mounted on member 27; as shown in FIG. 4. Detachable brace 28 is secured at its bottom end by means of latch 33. Hand chasis 2 is provided with a metal support 34 situated immediately beneath tray member 35. Tray 35 houses a battery for powering the VCR unit.

Figure 3:
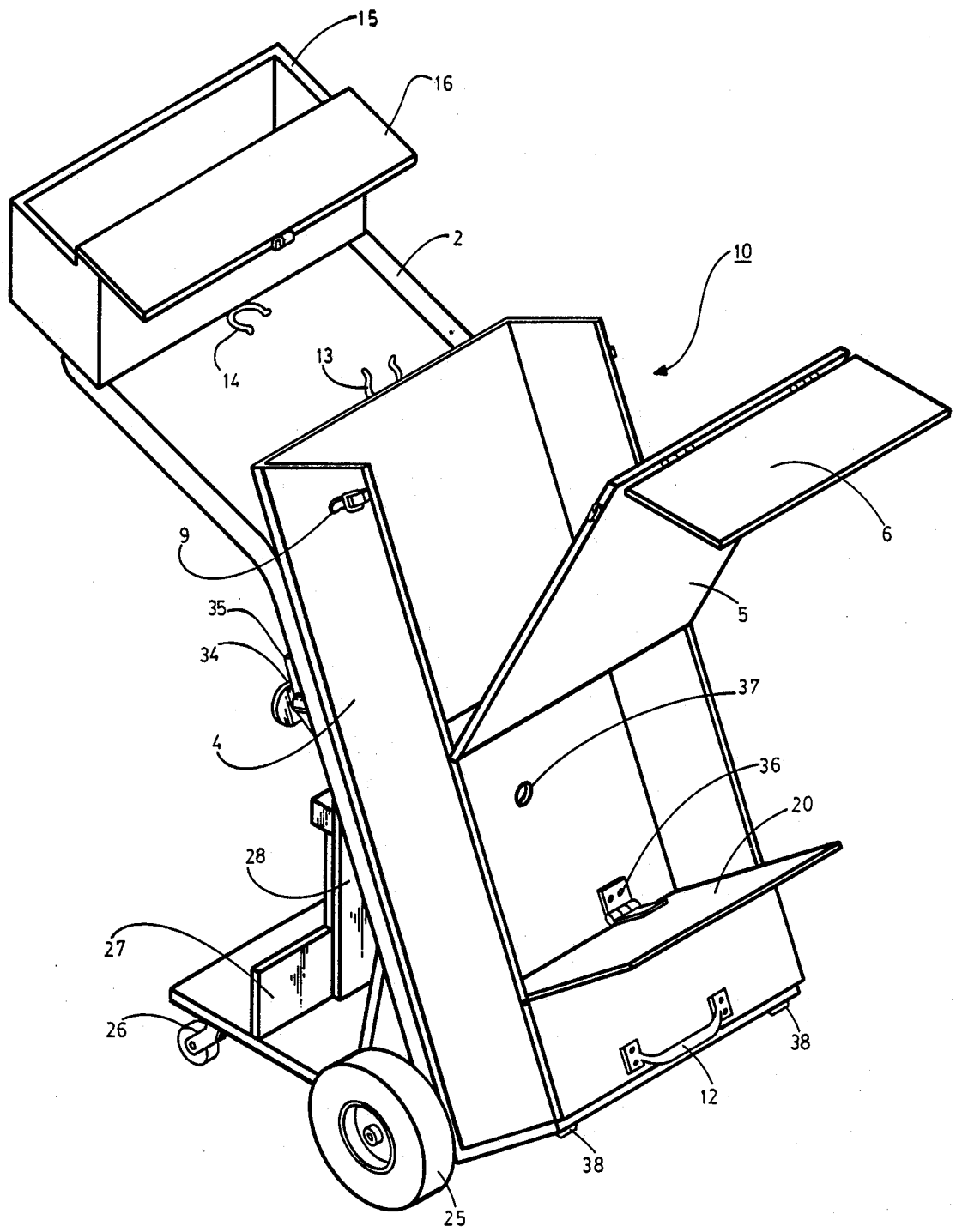
FIG. 3 is a front perspective view of an unfolded video cart showing open compartments for storage of filming equipment.

FIG. 3 illustrates the unfolded and filming readiness of unit 10. Herein, the major compartments 4 and 15 are seen in their open position. Unit 10 is provided with plastic stoppers 38 which function essentially to level unit 10 in an upright position. Lip 20 is shown in its down position wherein it is available to house a 12 volt battery power supply. Hinges 36 anchor lip 20 to housing 1. Hole 37 is centered in the rear wall of housing 1 to permit wire connectors to the 12 volt battery when the camera unit is operational. Moreover, hole 37 also facilitates wire connections between the TV monitor and the VCR unit.

Referring now to FIG. 4, it can be seen how the video cart 10, in accordance with the invention, can be arranged for filming various subject matter. Monopode 39 is positioned over shank 29, at its bottom end, while being engagedly aligned and retained by each rest 13 and 14.

In compliance with the statues so governing, the invention has been set forth in language more or less specific in accounting for structural and functional features. However, it is understood that the invention is not limited to the specific features shown but that the means and construction herein disclosed comprise a preferred form of executing the invention, while numerous modifications of the discloses embodiments will undoubtedly occur to those of skill in the art and the spirit and scope of the invention is to be limited solely in light of the appended claims.

I claim:

1. A maneuverable and foldable video cart, especially for use in filming on location, said cart comprising:

a rigid upright chasis mounted on a pair of pneumatic wheels;

an upright and divided rectangular housing member mounted on the lower end of said chasis and containing several compartments for use in the storage of operating accessories essential to filming with a video camera;

a smaller and undivided rectangular compartment disposed at the upper end of said chasis and also used to store operating accessories necessary for video filming;

a foldable platform member, said platform including a pair of rollers for engaging a surface along with the pneumatic wheels, a detachable brace to support a reclined chasis in an optimum filming position when said brace is latched onto the platform member, at one end, and supportedly located beneath a rearward situated tray attached to the upright and divided housing member at another end; and first and second opposing U-shaped rests for detachably engaging a camera monopode, said first rest being rearwardly mounted onto the divided rectangular housing and said second rest being bottom and frontally mounted onto the undivided rectangular compartment.

2. A maneuverable and foldable video cart according to claim 1, wherein the upright and divided rectangular housing contains (a) a bottom compartment for video camera accessories, (b) a middle compartment having a hinged lip, which in the down position supports a 12 volt battery power supply, (c) a top compartment which houses a television monitor, wherein said top compartment is provided with latched and hinged means for opening and closing same, and (d) a lower side hook for engaging the bottom end of a camera monopode when not in service.

3. A maneuverable and foldable video cart according to claim 1, wherein the cart is in its unfolded and operative position by having the platform lowered so that said pair of pneumatic wheels and said pair of rollers simultaneously engage the surface, and said detachable brace member is latched onto the platform member, at one end, and located beneath a rearward situated tray attached to the upright and divided housing member, at another end.

4. A maneuverable and foldable video cart according to claim 3, wherein a camera monopode is aligned, at its bottom end and intermediately positioned between said opposed U-shaped rests, one of which is rearwardly disposed at the top end of the upright and divided rectangular housing and a second rest that is bottom and frontally disposed on a smaller and undivided rectangular compartment.

* * * * *